US009767104B2

(12) United States Patent
Benight

(10) Patent No.: US 9,767,104 B2
(45) Date of Patent: Sep. 19, 2017

(54) FILE SYSTEM FOR EFFICIENT OBJECT FRAGMENT ACCESS

(71) Applicant: NetApp, Inc., Sunnyvale, CA (US)

(72) Inventor: Barry Patrick Benight, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 362 days.

(21) Appl. No.: 14/475,332

(22) Filed: Sep. 2, 2014

(65) Prior Publication Data
US 2016/0063008 A1 Mar. 3, 2016

(51) Int. Cl.
*G06F 17/30* (2006.01)

(52) U.S. Cl.
CPC .... *G06F 17/30082* (2013.01); *G06F 17/3012* (2013.01)

(58) Field of Classification Search
CPC .......................... G06Q 10/10; G06F 17/30011
USPC .......................................................... 707/694
See application file for complete search history.

(56) References Cited

U.S. PATENT DOCUMENTS

| | | | |
|---|---|---|---|
| 6,115,200 A | 9/2000 | Allen et al. | |
| 6,505,216 B1 | 1/2003 | Schutzman et al. | |
| 6,714,371 B1 | 3/2004 | Codilian | |
| 6,735,033 B1 | 5/2004 | Codilian et al. | |
| 7,177,248 B2 | 2/2007 | Kim et al. | |
| 7,333,282 B2 | 2/2008 | Iseri et al. | |
| 7,408,732 B2 | 8/2008 | Kisaka et al. | |
| 8,099,605 B1 * | 1/2012 | Billsrom | G06F 11/1448 713/187 |
| 8,239,621 B2 | 8/2012 | Yamato | |
| 8,819,259 B2 | 8/2014 | Zuckerman et al. | |
| 8,838,911 B1 | 9/2014 | Hubin et al. | |
| 8,949,449 B2 | 2/2015 | Zuckerman et al. | |
| 8,959,305 B1 | 2/2015 | Lecrone et al. | |
| 8,990,162 B1 | 3/2015 | Kushwah et al. | |
| 2007/0104049 A1 | 5/2007 | Kim et al. | |
| 2007/0156405 A1 * | 7/2007 | Schulz | G10L 13/08 704/255 |

(Continued)

FOREIGN PATENT DOCUMENTS

WO      2013152811 A1      10/2013

OTHER PUBLICATIONS

Amer, et al.,"Data Management and Layout for Shingled Magnetic Recording," IEEE Transactions on Magnetics, Oct. 2011,vol. 47, No. 10,pp. 3691-3697, retrieved on Oct. 15, 2015 from http://www.ssrc.ucsc.edu/Papers/amer-ieeetm11.pdf.

(Continued)

*Primary Examiner* — Heather Herndon
*Assistant Examiner* — Allen Lin
(74) *Attorney, Agent, or Firm* — Gilliam IP PLLC

(57) ABSTRACT

Technology is disclosed for accessing data fragments of data objects. The method receives a request for storing a data fragment of a data object in the storage server. The request includes an object identifier of the data object. The method further extracts a first string from the object identifier. The method then determines whether there is an existing file system object having a file system name that matches the first string. If there is no file system object that has a file system name that matches the first string, the method stores the data fragment as a fragment file with a file system name matching the first string.

16 Claims, 10 Drawing Sheets

(56) References Cited

U.S. PATENT DOCUMENTS

| | | | |
|---|---|---|---|
| 2007/0177739 | A1 | 8/2007 | Ganguly et al. |
| 2007/0203927 | A1* | 8/2007 | Cave .................... G06F 17/301 |
| 2008/0126357 | A1* | 5/2008 | Casanova ......... G06F 17/30215 |
| 2008/0151724 | A1 | 6/2008 | Anderson et al. |
| 2008/0201401 | A1* | 8/2008 | Pugh ................... H04L 63/1441 709/201 |
| 2009/0100055 | A1* | 4/2009 | Wang ..................... G06F 21/564 |
| 2009/0154559 | A1* | 6/2009 | Gardner ............. H04N 21/2381 375/240.14 |
| 2009/0327840 | A1 | 12/2009 | Moshayedi |
| 2010/0030960 | A1 | 2/2010 | Kamalavannan et al. |
| 2010/0064166 | A1 | 3/2010 | Dubnicki et al. |
| 2010/0094921 | A1* | 4/2010 | Roy ........................ G06F 15/16 709/201 |
| 2010/0094957 | A1 | 4/2010 | Zuckerman et al. |
| 2010/0095060 | A1 | 4/2010 | Strange et al. |
| 2010/0293354 | A1 | 11/2010 | Perez et al. |
| 2011/0191629 | A1 | 8/2011 | Daikokuya et al. |
| 2011/0296104 | A1 | 12/2011 | Noda et al. |
| 2012/0060072 | A1 | 3/2012 | Simitci et al. |
| 2013/0238235 | A1* | 9/2013 | Kitchel .................. G01C 21/32 701/412 |
| 2014/0108707 | A1 | 4/2014 | Nowoczynski et al. |
| 2014/0207899 | A1 | 7/2014 | Mark et al. |
| 2014/0237024 | A1* | 8/2014 | Chen ..................... H04L 45/026 709/203 |
| 2014/0297680 | A1* | 10/2014 | Triou, Jr. .......... G06F 17/30516 707/769 |
| 2014/0331085 | A1 | 11/2014 | Dhuse et al. |
| 2014/0344532 | A1 | 11/2014 | Lazier |
| 2015/0067245 | A1 | 3/2015 | Kruger |
| 2015/0256577 | A1 | 9/2015 | Gutiérrez Vilar et al. |
| 2015/0378825 | A1 | 12/2015 | Resch |
| 2016/0179621 | A1 | 6/2016 | Schirripa et al. |

OTHER PUBLICATIONS

Amer, et al.,"Design Issue for a Shingled Write Disk System," 26th IEEE Symposium on Massive Storage Systems and Technologies (MSST 2010), May 2010,12 pages, retrieved on Oct. 20, 2015 from http://storageconference.us/2010/Papers/MSST/Amer.pdf.

Dunn, et al., "Shingled Magnetic Recording Models, Standardization, and Applications," SNIA Education, Storage Networking Industry Association, , Sep. 16, 2014, 44 pages, retrieved on Oct. 21, 2015 from http://www.snia.org/sites/default/files/Dunn-Feldman_SNIA_Tutorial_Shingled_Magnetic_Recording-r7_Final.pdf.

Feldman, et al., "Shingled Magnetic Recording Areal Density Increase Requires New Data Management," USENIX, The Advanced Computing Systems Association, Jun. 2013, vol. 38, No. 3, pp. 22-30, retrieved on Oct. 20, 2015 from https://www.cs.cmu.edu/~garth/papers/05_feldman_022-030_final.pdf.

Gibson, et al., "Direction for Shingled-Write and Two-Dimensional Magnetic Recording System Architectures: Synergies with Solid-State Disks," Carnegie Mellon University, Parallel Data Lab, Technical Report CMU-PDL-09-104, May 2009, 2 pages, retrieved on Oct. 20, 2015 from http://www.pdl.cmu.edu/PDL-FTP/PDSI/CMU-PDL-09-104.pdf.

Gibson, et al., "Principles of Operation for Shingled Disk Devices," Carnegie Mellon University, Parallel Data Laboratory, CMU-PDL-11-107, Apr. 2011, 9 pages, retrieved on Oct. 20, 2015 from http://www.pdl.cmu.edu/PDL-FTP/Storage/CMU-PDL-11-107.pdf.

Li, X., "Reliability Analysis of Deduplicated and Erasure-Coded Storage," ACM SIGMETRICS Performance Evaluation Review, vol. 38, No. 3, ACM New York, NY, Jan. 3, 2011, pp. 4-9.

Luo, "Implement Object Storage with SMR based Key-Value Store," 2015 Storage Developer Conference, Huawei Technologies Co., Sep. 2015, 29 pages, retrieved on Oct. 20, 2015 from http://www.snia.org/sites/default/files/SDC15_presentations/smr/QingchaoLuo_Implement_Object_Storage_SMR_Key-Value_Store.pdf.

Megans, "Spectra Logic Announces Breakthrough in Nearline Disk, ArcticBlue," SPECTA Logic, Boulder, CO, Oct. 15, 2015, 5 pages, retrieved on Oct. 20, 2015 from https://www.spectralogic.com/2015/10/15/spectra-logic-announces-breakthrough-in-nearline-disk-arcticblue/.

O'Reily; J., "RAID vs. Erasure Coding", Network Computing,Jul. 14, 2014, 2 pages, retrieved on Apr. 1, 2016 from http://www.networkcomputing.com/storage/raid-vs-erasure-coding/1792588127.

Renzoni, R., "Wide Area Storage From Quantum," Quantum Corporation, 2012, 24 pages.

Seshadri S., "High Availability and Data Protection with EMC Isilon Scale-Out NAS," EMC Corporation, White Paper, Jun. 2015, 37 pages, retrieved on Oct. 5, 2015 from https://www.emc.com/collateral/hardware/white-papers/h10588-isilon-data-availability-protection-wp.pdf.

SMR Layout Optimisation for XFS, Mar. 2015, v0.2, 7 pages, retrieved on Oct. 15, 2015 from http://xfs.org/images/f/f6/Xfs-smr-structure-02.pdf.

Speciale P., "Scality RING: Scale Out File System & Hadoop over CDMI," Scality, Storage Developer Conference, Sep. 19-22, 2014, 26 pages, retrieved on Oct. 5, 2015 from http://www.snia.org/sites/default/files/PaulSpeciale_Hadoop_Ring.pdf.

Suresh, et al., "Shingled Magnetic Recording for Big Data Applications," Parallel Data Laboratory, Carnegie Mellon University, Pittsburg, PA, CMU-PDL-12-105, May 2012, 29 pages, retrieved on Oct. 20, 2015 from http://www.pdl.cmu.edu/PDL-FTP/FS/CMU-PDL-12-105.pdf.

International Search Report and Written Opinion for Application No. PCT/US2015/048177 mailed on Dec. 10, 2015, 8 pages.

Rabin, "Efficient Dispersal of Information for Security, Load Balancing, and Fault Tolerance", Journal of the Association for Computing Machinery, vol. 36, No. 2, Apr. 1989, pp. 335-348.

* cited by examiner

FILE SYSTEM FOR EFFICIENT OBJECT FRAGMENT ACCESS

TECHNICAL FIELD

Embodiments of the disclosed technology generally relate to data storage systems. In particular, the embodiments relate to systems and methods for a data storage system having a file system for efficient object fragment access.

BACKGROUND

Entities such as companies gather, store, and analyze an increasing amount of data. Clusters of computing devices are used to facilitate efficient, cost-effective storage of large amounts of data. For example, a cluster network environment of computing devices (nodes) may be implemented as a data storage system to facilitate the creation, storage, retrieval, and/or processing of digital data. Such a data storage system may be implemented using various storage architectures, such as a network-attached storage (NAS) environment, a storage area network (SAN), a direct-attached storage environment, and combinations thereof. The data storage systems may comprise one or more data storage devices configured to store digital data within data volumes.

The data can be organized as large data objects. Due to the size, large data objects are sometimes divided into multiple data segments stored in separate data storage nodes. The data segments are further divided into multiple data fragments, which are stored data storage devices of a data storage node. As a result, a data storage node can store millions, or even billions, of data fragments for different data objects.

Typically, the data storage node maintains a database for organizing and storing the metadata of the data fragments. When the data storage node receives a request for accessing data fragments of a particular data object, the data storage node scans the database to identify the data fragments of the data object and to retrieve the file system locations of the identified data fragments. Then the data storage node reads the contents of the identified data fragments based on the file system locations. However, it is often a challenge to efficiently identify the data fragments from the database that stores metadata for millions of data fragments.

BRIEF DESCRIPTION OF THE DRAWINGS

Objects, features and characteristics of the disclosed technology will become more apparent to those skilled in the art from a study of the following detailed description in conjunction with the appended claims and drawings, all of which form a part of this specification. In the drawings:

DETAILED DESCRIPTION

Technology for using a file directory structure as a key-value store to allow for efficient access to data objects is disclosed herein ("the technology"). Using the technology, a data storage node can quickly determine based on an object identifier whether any fragments of a given data object are stored in the data storage node. The data storage node can also efficiently identify all fragment(s) (if any) of the given data object stored in the data storage node and provide access to the fragment(s).

In order to efficiently use the file directory structure as a key-value store, the technology incorporates into fragment files various metadata such as, but not limited to, an object identifier, segment identifier and fragment identifier. The technology partitions the object identifier of a given data object into multiple sections. The technology uses the sections of the object identifier to locate the fragment(s) within the file directory structure.

For example, the first three sections of the object identifier can be sec1, sec2 and sec3. The technology determines whether /sec1/sec2 represents an existing file system object in the file directory structure. If there is no such file system object, no data fragment is stored in the storage space represented by the file directory structure. If there is a file system object /sec1/sec2 and if the file system object is a file, such a file can be the only fragment of the data object. The technology verifies the object identifier in the metadata portion of the file and provides access to the file as part of the data of the data object.

If there is a file system object /sec1/sec2 and if the file system object is a directory, there may be more than one fragment of the data object existing in the directory. The technology searches within the directory /sec1/sec2 for any files having file names including the third section of the object identifier sec3. If there are such files with names including sec3, the technology verifies the data objects in the metadata portions of the files and provides access to the files as part of the data of the data object.

The technology can further provide a directory index (e.g. B-tree) for the file directory structure. The directory index helps to achieve a fast convergence when the technology searches the file directory structure for sections of the object identifier. Furthermore, because of the small directory names and file names containing the sections of the object identifiers, the size of the file directory structure is also kept small. This increases the efficiency when traversing the file directory structure.

The technology does not need a separate database to handle the searching the file system objects. The technology can directly traverse the file directory structure based on the sections of the object identifiers, because the directory names and file names are configured according to the corresponding sections of the object identifiers.

Figure 1:
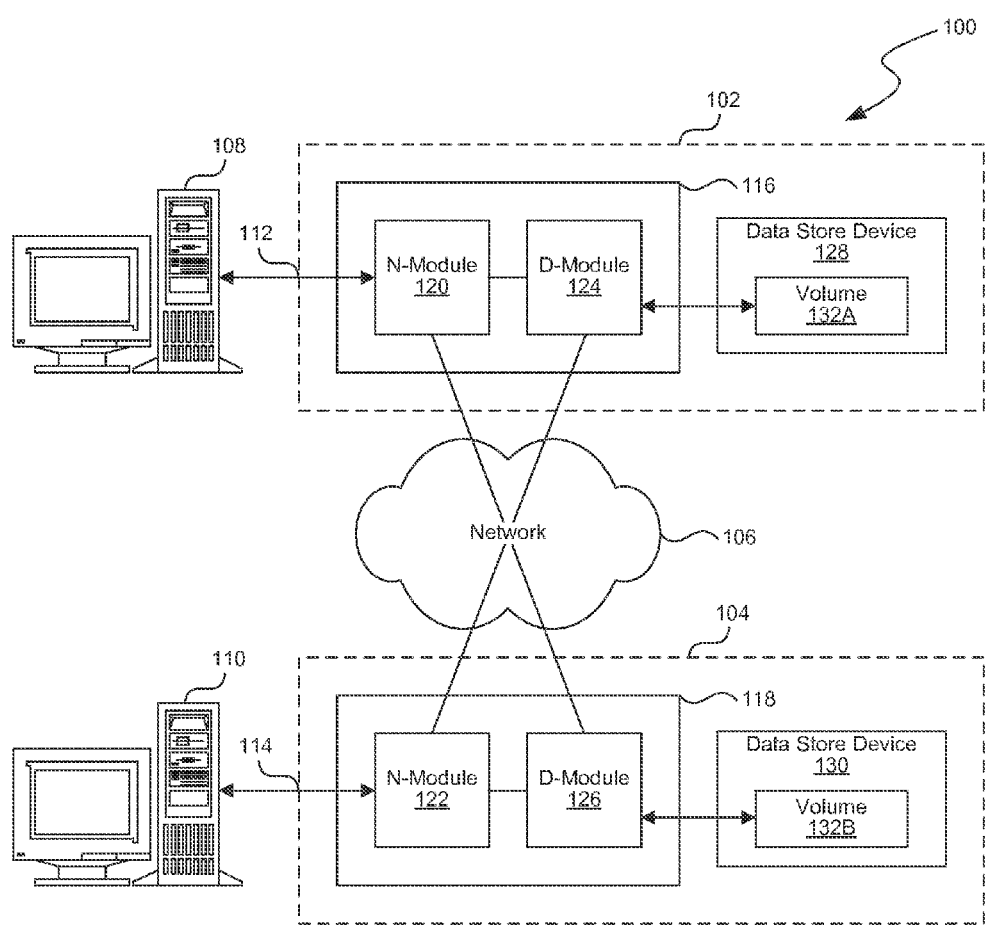
FIG. 1 is a block diagram illustrating a clustered network storage environment, in which the technology can operate in various embodiments.

Turning now to the figures, FIG. 1 is a block diagram illustrating a clustered network storage environment, in which the technology can operate in various embodiments. System 100 of FIG. 1 comprises data storage systems 102 and 104 that are coupled via network 106. Data storage systems 102 and 104 can comprise one or more modules, components, etc., operable to provide operation as described herein. For example, data storage systems 102 and 104 can comprise nodes 116 and 118 and data storage devices 128 and 130, respectively. It should be appreciated that nodes and/or data storage devices of data storage systems 102 and 104 may themselves comprise one or more modules, components, etc. Nodes 116 and 118 comprise network modules (referred to herein as "N-Modules") 120 and 122 and data modules (referred to herein as "D-Modules") 124 and 126, respectively. Data storage devices 128 and 130 comprise volumes 132A and 132B of user and/or other data, respectively.

The modules, components, etc. of data storage systems 102 and 104 may comprise various configurations suitable for providing operation as described herein. For example, nodes 116 and 118 may comprise processor-based systems, e.g., file server systems, computer appliances, computer workstations, etc. Accordingly, nodes 116 and 118 of embodiments may comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Examples of data storage devices 128 and 130 are hard disk drives, solid state drives, flash memory cards, optical drives, etc., and/or other suitable computer readable storage media. Data modules 124 and 130 of nodes 116 and 118 may be adapted to communicate with data storage devices 128 and 130 according to a storage area network (SAN) protocol (e.g., small computer system interface (SCSI), fiber channel protocol (FCP), INFINIBAND, etc.) and thus data storage devices 128 and 130 may appear a locally attached resources to the operating system. That is, as seen from an operating system on nodes 116 and 118, data storage devices 128 and 130 may appear as locally attached to the operating system. In this manner, nodes 116 and 118 may access data blocks through the operating system, rather than expressly requesting abstract files.

Network modules 120 and 122 may be configured to allow nodes 116 and 118 to connect with client systems, such as clients 108 and 110 over network connections 112 and 114, to allow the clients to access data stored in data storage systems 102 and 104. Moreover, network modules 120 and 122 may provide connections to one or more other components of system 100, such as network 106. For example, network module 120 of node 116 may access data storage device 130 via communication via network 106 and data module 126 of node, 118. The foregoing operation provides a distributed storage system configuration for system 100.

Clients 108 and 110 of the embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under the control of an instruction set (e.g., software, firmware, applet, code, etc.) providing operation as described herein.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide the infrastructure for network connections 112 and 114 or, alternatively, network connections 112 and/or 114 may be provided by network infrastructure and be separate from network 106, wherein such separate network infrastructure may itself comprise a SAN, the Internet, the PSTN, a LAN, a MAN, a WAN, a wireless network, and/or the like.

As can be appreciated from the foregoing, system 100 provides a data storage system in which various digital data may be created, maintained, modified, accessed, and be migrated (referred to collectively as data management). A logical mapping scheme providing logical data block mapping information, stored within and stored without the data structures, may be utilized by system 100 to provide such data management. For example, data files stored in the data storage device 128 can be migrated to the data storage device 130 through the network 106.

In some embodiments, data storage devices 128 and 130 comprise volumes (shown as volumes 132A and 132B, respectively), which implements storage of information onto disk drives, disk arrays, and/or other data stores (e.g., flash memory) as a file system for data, for example. Volumes can span a portion of a data store, a collection of data stores, or portions of data stores, for example, and typically define the overall logical arrangement of file storage on data store space in the storage system. In some embodiments, a volume can comprise stored data as one or more files that reside in a hierarchical directory structure within the volume.

Volumes are typically configured in formats that may be associated with particular storage systems, and respective volume formats typically comprise features that provide functionality to the volumes, such as allowing for volumes to form clusters. For example, where a first storage system may utilize a first format for their volumes, a second storage system may utilize a second format for their volumes.

In the configuration illustrated in system 100, clients 108 and 110 can utilize data storage systems 102 and 104 to store and retrieve data from volumes 132A and 132B. In such an embodiment, for example, client 108 can send data packets to N-module 120 in node 116 within data storage system 102. Node 116 can forward the data to data storage device 128 using D-module 124, where data storage device 128 comprises volume 132A. In this way, the client can access storage volume 132A, to store and/or retrieve data, using data storage system 102 connected by network connection 112. Further, in this embodiment, client 110 can exchange data with N-module 122 in node 118 within data storage system 104 (e.g., which may be remote from data storage system 102). Node 118 can forward the data to data storage device 130 using D-module 126, thereby accessing volume 132B associated with the data storage device 130.

Figure 2:
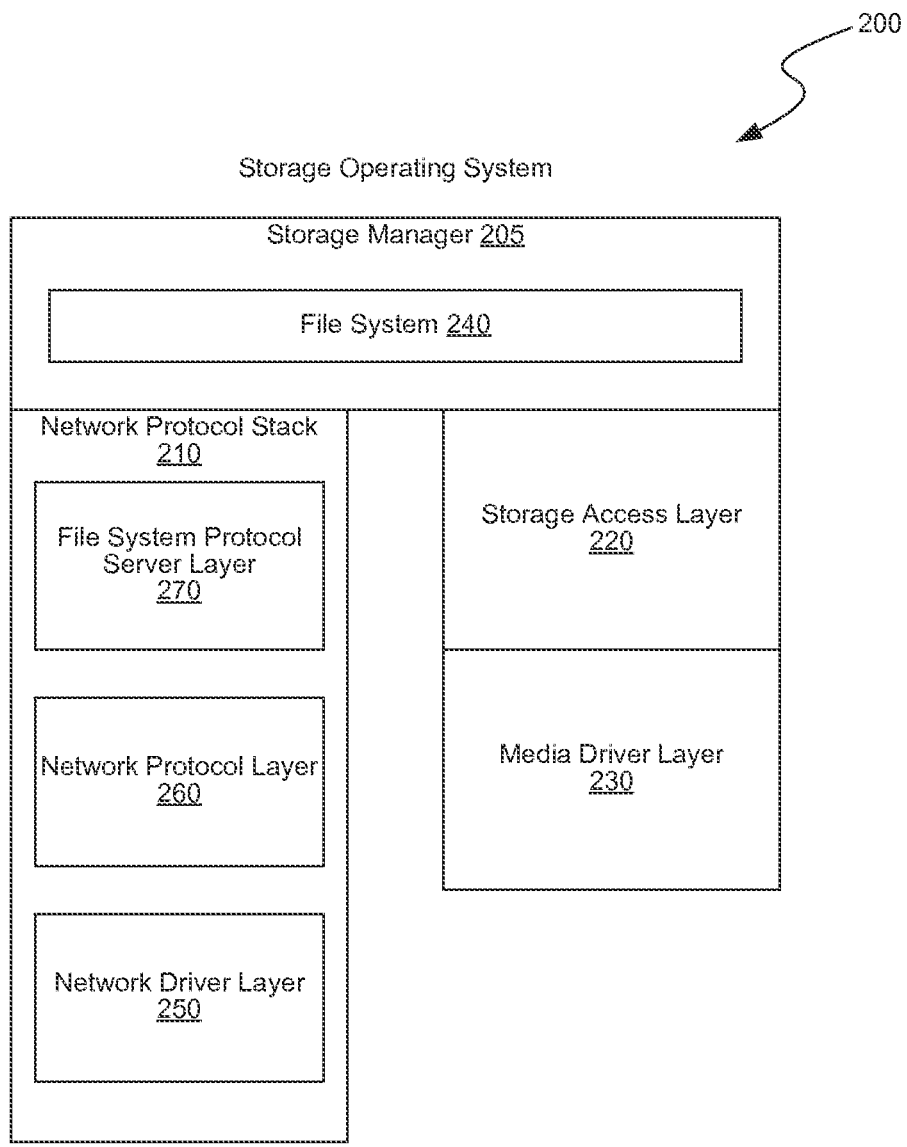
FIG. 2 is a block diagram of a storage operating system, according to various embodiments.

FIG. 2 is a block diagram of a storage operating system, according to various embodiments. As used herein, the term "storage operating system" generally refers to the computer-executable code operable on a computer or a computer cluster used to perform a storage function that manages data access and other related functions. Storage operating system 200, can be implemented as a microkernel, an application program operating over a general-purpose operating system, or as a general-purpose operating system configured for the storage applications as described herein.

In the illustrated embodiment, the storage operating system 200 includes a network protocol stack 210 having a series of software layers including a network driver layer 250 (e.g., an Ethernet driver), a network protocol layer 260 (e.g., an Internet Protocol layer and its supporting transport mechanisms: the TCP layer and the User Datagram Protocol layer), and a file system protocol server layer 270 (e.g., a CIFS server, a NFS server, etc.). In addition, the storage operating system 200 includes a storage access layer 220 that implements a storage media protocol such as a RAID protocol, and a media driver layer 230 that implements a storage media access protocol such as, for example, a Small Computer Systems Interface (SCSI) protocol.

Any and all of the modules of FIG. 2 can be implemented as separate hardware component. For example, the storage access layer 220 may alternatively be implemented as a parity protection RAID module and embodied as a separate hardware component such as a RAID controller. Bridging the storage media software layers with the network and file system protocol layers is a storage manager 205 that implements one or more file system(s) 240.

Figure 3:
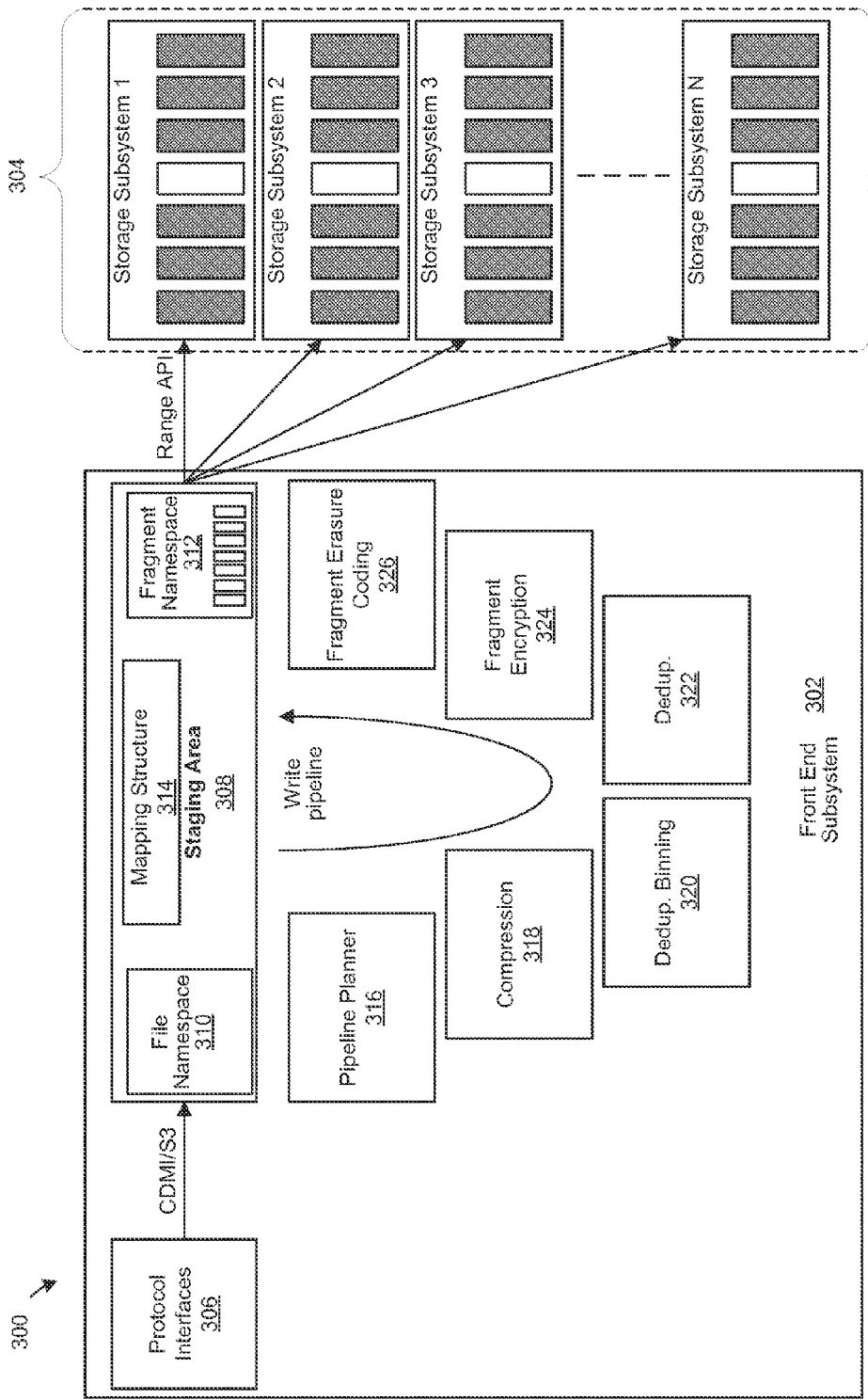
FIG. 3 is a control flow diagram of a data storage system, according to various embodiments.

FIG. 3 is a control flow diagram of a data storage system 300, according to various embodiments. The data storage system 300 includes a front-end subsystem 302 and multiple storage subsystems 304. The front-end subsystem 302 can be one or more computer systems, connected to the storage subsystems 304 over a network (e.g., a global network or a local network). The front-end subsystem 302 can be on the same rack as or a separate rack from the storage subsystems 304.

The front-end subsystem 302 includes a protocol interfaces module 306. The protocol interfaces module 306 defines one or more of the functional interfaces that applications and devices used to store, retrieve, update, and delete data elements from the data storage system 300. For example, the protocol interfaces module 306 can implement a Cloud Data Management Interface (CDMI), a Simple Storage Service (S3) interface, or both. While the data storage system 300 can be adapted to never delete or update any written data, the data storage system 300 can emulate the deletion of data ranges by removing the metadata associated with the data ranges and/or making an indication that the memory spaces occupied by the data ranges are available to be overwritten. The data storage system 300 can emulate an update by storing an updated data range as a new data range, updating metadata associated with the updated data range, and marking any metadata associated with the old data range with an indication of deletion.

The front-end subsystem 302 also includes a staging area 308. The staging area 308 is a memory space implemented by one or more data storage devices within or accessible to the front-end subsystem 302. For example, the staging area 308 can be implemented by solid-state drives, hard disks, volatile memory, or any combination thereof. The staging area 308 can maintain a file namespace 310 to facilitate client interactions through the protocol interfaces module 306. The file namespace 310 manages a set of data container identifiers, each corresponding to a dataset from clients of the front-end subsystem 302. The staging area 308 also maintains a fragment namespace 312 corresponding to the file namespace 310. The fragment namespace 312 manages a set of fragment identifiers, each corresponding to a data range stored in the multiple storage subsystems 304. In various embodiments, the staging area 308 can store a mapping structure 314 that stores associations between the data container identifiers of the file namespace 310 and the fragment identifiers of the fragment namespace 312. Alternatively, the staging area 308 does not have to store such a mapping structure.

The staging area 308 can also serve as a temporary cache to process payload data from a write request received at the protocol interfaces module 306. The front-end subsystem 302 can process incoming write requests via a data processing pipeline through a pipeline planner module 316. When the pipeline planner module 316 receives an incoming write request, the pipeline planner module 316 can determine what types of storage efficiency processes to perform on the payload data of the write request prior to sending the payload data into persistent storage in the storage subsystems 304.

The storage efficiency processes can include compression of the payload data as implemented by a compression module 318, deduplication of the payload data as implemented by a deduplication binning module 320 and a deduplication module 322, fragment encryption as implemented by a fragment encryption module 324, and erasure coding as implemented by a fragment erasure coding module 326. The pipeline planner module 316 can improve storage efficiency by allocating processing time (e.g., as measured by absolute time, processing cycles, or process iterations) to each of these storage efficiency processes. While the storage efficiency processes is illustrated in FIG. 3 in a given order, alternative embodiments may perform these storage efficiency processes in a different order, and some processes may be removed, moved, added, subdivided, combined, and/or modified to provide alternatives or sub-combinations. The scheduled order of storage efficiency processes can be saved to enable a reversal of the storage efficiency processes in order to execute a subsequently received client read request to retrieve the payload data.

The compression module 318 implements one or more compression algorithms. The pipeline planner module 316 can schedule the compression module 318 to try a subset or all of the one or more compression algorithms on the payload data. The compressed payload data taking up the least memory space can then be piped to the next storage efficiency process.

The deduplication binning module 320 implements one or more deduplication binning techniques. The term "deduplication binning" here refers to a method of splitting data chunks (e.g., the payload data chunks or the compressed payload data chunks) into data fragments ("bins") and performing deduplication of a chosen fragment of chunks. The deduplication module 322 implements one or more deduplication techniques working in conjunction with the one or more deduplication binning techniques. The pipeline planner module 316 can schedule for any combination of deduplication binning techniques and deduplication techniques on the payload data or the compressed payload data. The deduplicated payload data from a combination of deduplication binning and the deduplication techniques with the best result (e.g., largest amount of redundant data removed) can then be piped to the next storage efficiency process.

The fragment encryption module 324 implements one or more encryption techniques. The pipeline planner module 316 can schedule the fragment encryption module 324 to encrypt fragments of the incoming data (e.g., deduplicated and compressed payload data). As part of the deduplication binning process, the payload data can be split into data fragments. The fragment encryption module 324 can encrypt the resultant fragments of the payload data from the deduplication process. The encrypted fragments are then piped to the next storage efficiency process.

The fragment erasure coding module 326 implements one or more erasure coding techniques. The term "erasure coding" herein refers to transforming payload data of k fragments into erasure coded data of N fragments, where N>k, such that the payload data can be recovered from a subset of the N. The pipeline planner module 316 can schedule the fragment erasure coding module 326 to try a subset or all of the one or more erasure coding techniques on the incoming fragments (e.g., deduplicated fragments and/or encrypted fragments). As part of the deduplication binning process or the fragment encryption process, the payload data can be split into data fragments. The fragment erasure coding module 326 can erasure code the resultant fragments of the payload data from the deduplication process and/or the fragment encryption process. The erasure coded fragments with the optimal code rate and reception efficiency are then piped to the next storage efficiency process. The term "code rate" herein refers to the fraction k/N and the term "reception efficiency" refers to the fraction k'/k, where k' denotes the minimum number of fragments needed for recovery of the payload data.

Figure 4:
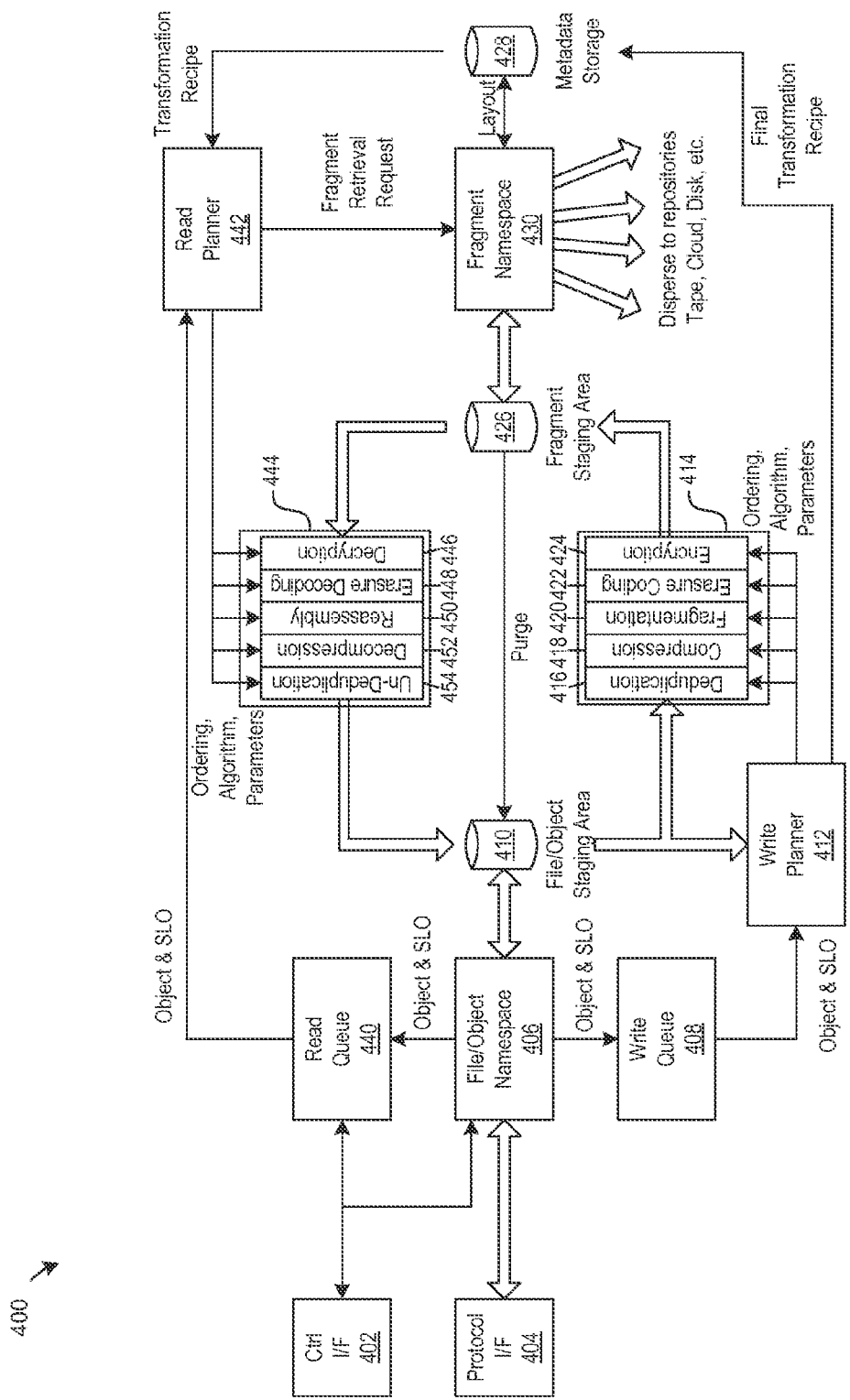
FIG. 4 is a control flow diagram of a storage front-end system, according to various embodiments.

FIG. 4 is a control flow diagram of a storage front-end system 400, according to various embodiments. The storage front-end system 400 may be a front-end subsystem (e.g., the front-end subsystem 302) for an data storage system, e.g., the data storage system 300 of FIG. 3. The storage front-end system 400 includes one or more control interfaces 402 and one or more protocol interfaces 404. The control interfaces 402 can provide monitoring, management configuration and other non-data-related functions. The protocol interfaces 404 feed into the file/object namespace module 406 (e.g., the file namespace 310 of FIG. 3). The protocol interfaces 404 can be a Cloud Data Management Interface (CDMI) interface or the S3 interface. The protocol interfaces 404 enable the storage front-end system 400 to interact with clients over a network. The protocol interfaces 404 can deliver client requests, including both read requests and write requests, to the file object namespace module 406. A client request can include an object identifier and a service level objective (SLO) of the request.

If the client request is a write request, the file object namespace module 406 adds the write request (e.g., including a data object identifier and a write request SLO) to a write queue 408. The payload of the write request can be stored in a file object staging area 410 (e.g., the staging area 308 of FIG. 3). The write queue 408 can process write requests cached therein in the order the write requests are received (absent a message that overwrites the priority of one of the write requests), or process write requests out of order. The write queue 408 can process each write request through a write planner module 412 (e.g., the pipeline planner module 316 of FIG. 3). Based on the payload data and other information in the write request (e.g., the SLO), the write planner module 412 selects storage preprocessing techniques to process the write request.

The write planner module 412 can also determine what order the storage preprocessing techniques are to be applied on the payload data and the parameters for running the storage preprocessing techniques. The write planner module 412 can transmit the selection of techniques, the order of the application of the techniques, and the parameters for the techniques in a transformation recipe to a storage preprocessor subsystem 414. The write planner module 412 can operate iteratively. That is, the write planner module 412 can plan a permutation of techniques and/or options for the techniques, and based on the results, further change the options or the techniques in order to optimize one or more variables (e.g., storage performance indicators) to achieve a better end result.

The storage preprocessor subsystem 414 implements the storage preprocessing techniques. For example, the storage preprocessor subsystem 414 can include a deduplication module 416 (e.g., the deduplication module 322 and the deduplication binning module 320 of FIG. 3), a compression module 418 (e.g., the compression module 318 of FIG. 3), a fragmentation module 420 to divide the payload data into fragments (e.g., for deduplication binning, erasure coding, and/or fragment encryption), an erasure coding module 422 (e.g., the fragment erasure coding 326 of FIG. 3), an encryption module 424 (e.g., the fragment encryption module 324 of FIG. 3), or any combination thereof. The storage preprocessor subsystem 414 can also include one or more of the compression module 318 of FIG. 3, the deduplication binning module 320 of FIG. 3, the deduplication module 322 of FIG. 3, the fragment encryption module 324 of FIG. 3, or the fragment erasure coding module 326 of FIG. 3.

After processing the payload data in accordance with the chosen transformation recipe, the storage preprocessor subsystem 414 deposits the processed fragments into a fragment staging area 426. The transformation recipe for the processed fragments can be stored as part of one or more of the fragments, and can also be stored into a metadata storage 428. The metadata storage 428 stores both the transformation recipe and optionally a data layout of the processed fragments. The signal path labeled "purge" allows the storage front-end system 400 to reclaim space in the file/object namespace module 406 when the data is fully stored as fragments.

A fragment namespace module 430 can retrieve the processed fragments from the fragment staging area 426 and store the processed fragments to one or more repositories. For example, the repositories can include tape drives, cloud storage, local or external disk drives, the storage subsystems 304 of FIG. 3, or any combination thereof. The fragment namespace module 430 can store the data layout of the processed fragments in the metadata storage 428.

If the client request is a read request, the file object namespace module 406 adds the read request (e.g., including a requested data object identifier and a read request SLO) to a read queue 440. The read queue 440 can process read requests cached therein in the order the read requests are received (absent a message that overwrites the priority of one of the read requests), or process the reads out of order. The read queue 440 can process each read request through a read planner module 442. Based on the data object identifier and other information in the read request (e.g., the SLO), the read planner module 442 can retrieve the transformation recipe corresponding to the requested data object from the metadata storage 428 or from a corresponding fragment.

The read planner module 442 can send a fragment retrieval request to the fragment namespace module 430. In response, the fragment namespace module 430 can retrieve the fragments corresponding to the requested data object from the repositories. The fragment namespace module 430 can identify the data layout of the fragments corresponding to the requested data object from the metadata storage 428. Alternatively, the metadata of the fragments are stored in the fragment files.

The read planner module 442 can then send the retrieved fragments to a reverse processor subsystem 444 to reconstruct the requested data object from the retrieved fragments. Based on the transformation recipe, the read planner module 442 can select reverse processing techniques, determine the ordering of how the reverse processing techniques are to be applied to the retrieved fragments, and choose the parameters for running the reverse processing techniques. The read planner module 442 can send the retrieved fragments along with the selection of techniques, the order of the techniques, and the parameters of the techniques.

The reverse processor subsystem 444 may include a decryption module 446, an erasure decoding module 448, a reassembly module 450, a decompression module 452, an un-deduplication module 454, or any combination thereof. The decryption module 446 can apply one or more decryption techniques on the fragments, each technique utilizing a cryptographic key. The decryption module 446 can be configured in association with the encryption module 424. For example, the decryption module 446 and the encryption module 424 can share a symmetric key or can each possess an asymmetric key coupled to each other (e.g., a private decryption key and a public encryption key). The erasure decoding module 448 can reconstruct an original set of fragments utilizing all or a subset of erasure coded fragments. The erasure decoding module 448 can be configured in association with the erasure coding module 422 such that the erasure decoding module 448 can reverse the effects of the erasure coding module 422.

The reassembly module 450 can assemble the de-processed fragments back to a continuous dataset. The reassembly module 450 can be configured in association with the fragmentation module 420 to reverse the effects of the fragmentation module 420. The decompression module 452 can execute one or more decompression techniques to expand a compressed dataset to its raw format. The decompression module 452 can be configured in association with the compression module 418 to reverse the effects of the compression module 418. The un-deduplication module 454 can be configured in association with the deduplication module 416 to reverse the effects of the deduplication module 416.

After the reverse processor subsystem 444 reconstructs the original data object, the reverse processor subsystem 444 deposits the original data object in the file/object staging area 410. The original data object can be a file, an object, a volume, a data range sequence, a binary string, a data aggregate, or any combination thereof. The file/object namespace module 406 can determine when the original data object has been deposited into the file object staging area 410. In response, the file/object namespace module 406 can respond to the read request via at least one of the protocol interfaces 404 by sending the original data object back to the client.

Implementations of the storage preprocessor subsystem 414 and the reverse processor subsystem 444 enable the storage front-end system 400 to improve storage efficiency using storage processing pipeline optimization. The storage preprocessor subsystem 414 implements a pipeline of storage preprocessing techniques that improves storage efficiency. The storage preprocessor subsystem 414 presumes that the repositories utilized by the fragment namespace module 430 are high-latency storage devices, where storage devices therein are frequently deactivated. Because of this, the storage preprocessor subsystem 414 utilizes the additional time to optimize the pipeline for even higher storage efficiency that traditional systems could not previously achieve.

Regarding FIGS. 1-4, portions of components and/or modules may each be implemented in the form of special-purpose circuitry, or in the form of one or more appropriately programmed programmable processors, or a combination thereof. For example, the modules described can be implemented as instructions on a tangible storage memory capable of being executed by a processor or a controller in the control circuitry. The tangible storage memory may be volatile or non-volatile memory. In some embodiments, the volatile memory may be considered "non-transitory" in the sense that it is not a transitory signal. Modules may be operable when executed by a processor or other computing device, e.g., a single board chip, an application specific integrated circuit, a field programmable field array, a network capable computing device, a virtual machine terminal device, a cloud-based computing terminal device, or any combination thereof. Memory spaces and storages described in the figures can be implemented with the tangible storage memory as well, including volatile or non-volatile memory.

Each of the modules and/or components may operate individually and independently of other modules or components. Some or all of the modules may be executed on the same host device or on separate devices. The separate devices can be coupled together through one or more communication channels (e.g., wireless or wired channel) to coordinate their operations. Some or all of the components and/or modules may be combined as one component or module.

A single component or module may be divided into sub-modules or sub-components, each sub-module or sub-component performing a separate method step or method steps of the single module or component. In some embodiments, at least some of the modules and/or components share access to a memory space. For example, one module or component may access data accessed by or transformed by another module or component. The modules or components may be considered to be "coupled" to one another if they share a physical connection or a virtual connection, directly or indirectly, enabling data accessed or modified from one module or component to be accessed in another module or component. In some embodiments, at least some of the modules can be upgraded or modified remotely.

Figure 5:
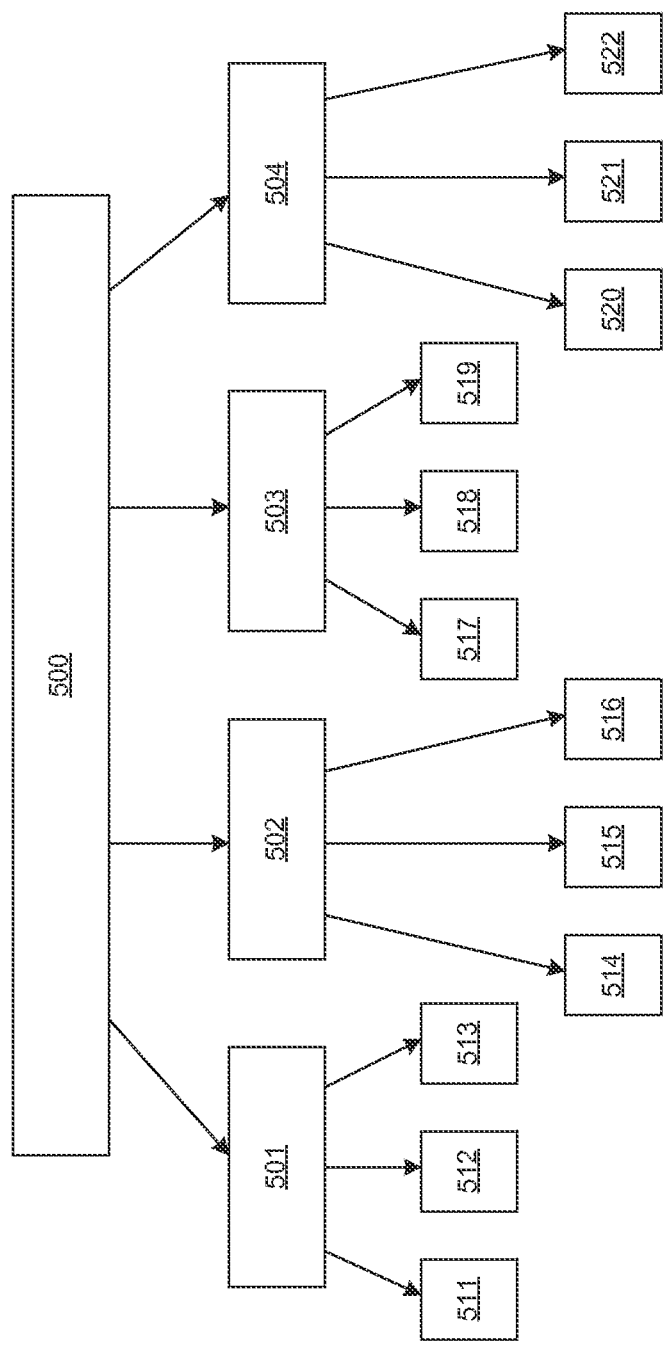
FIG. 5 is a block diagram illustrating a data object, according to various embodiments.

A data object can be divided into multiple data segments handled by multiple data storage nodes. FIG. 5 is a block diagram illustrating a data object, according to various embodiments. An erasure coding module (e.g., fragment erasure coding module 326 of FIG. 3) divides the data object 500 into four data segments 501-504. Although FIG. 5 shows four data segments for illustration purposes, a person having ordinary skill the art will readily appreciate that a data object can be divided into an arbitrary number of data segments. The erasure coding module incorporates redundant information of the data object 500 into the data segments 501-504, such that the data object 500 can be reconstructed using any three of the four data segments 501-504. In other words, the erasure coding scheme (as shown in FIG. 3) has a code rate $k/N=3/4$.

A person having ordinary skill in the art will readily appreciate that the erasure coding scheme of the data segments can have other code rate. In various embodiments, multiple data storage nodes store the data segments 501-504 respectively. Due to the data redundancy, the failure of a data storage node or the loss of a segment does not preclude the reconstruction of the data object from the remaining data segments. The data object can be reconstructed, as long as at least three of the data segments 501-504 are available. Alternatively, multiple data segments can be stored in a single data storage node.

The data segments 501-504 are further divided into data fragments 511-522. The data fragments 511-522 include redundant information from corresponding data segments 501-504. For example, the data fragments 511-513 include redundant information from the data segment 501, such that the data segment 501 can be reconstructed using any two of the data fragments 511-513. In other words, the erasure coding scheme for the data fragments 511-522 has a code rate k/N=2/3. Similarly, a person having ordinary skill in the art will readily appreciate that the erasure coding scheme of the data segments can have a code rate other than 2/3 or that the number of data fragments for a corresponding data segments can be a number other than 3.

The erasure coding scheme for data fragments 511-522 can use the same or a different erasure coding method to compare the erasure coding scheme for data segments 501-504. In various embodiments, multiple data storage devices of a node can store data fragments of a data segment. Due to the data redundancy, the failure of a data storage device or the loss of a fragment does not preclude the reconstruction of a data segment from the remaining data fragments. Alternatively, multiple data fragments can be stored in a single data storage device.

Therefore, a data object is divided into data segments and stored across multiple data storage nodes. In turn, a data segments is divided into data fragments and stored across multiple data storage devices of a node. When a client device requests access to the data object, the data storage nodes are responsible for locating and accessing the data fragments. A sufficient number of data fragments (depending on the erasure code rate) are needed to reconstruct the data object. When a node is asked to supply a data segment of a data object, the node is responsible for identifying the corresponding fragments and determining whether the node has sufficient fragments to reconstruct the data segment.

A traditional way of keeping track of the stored data fragments is for the node to maintain a database. The database can store information regarding the identification of stored data segments, identification of corresponding data fragments, file system locations (e.g., file names) of the data fragments, etc. Using the database, the node is able to identify and locate data fragments for the requested data segment. However, if the node stores a large number of data fragments, the size of the database can be large as well. The node loses the data access efficiency when the node spends a significant amount of time searching for information in the database.

To improve the data access efficiency due to the large number of stored data fragments, a storage node can use a partial key match technology, which is explained in the following paragraphs. The file system of the storage node is structured based on the object identifiers of the stored data fragments. The storage node tries locating data fragments, without the help of a database, by matching a portion of an object identifier with the directory and/or file names.

Figure 6A:
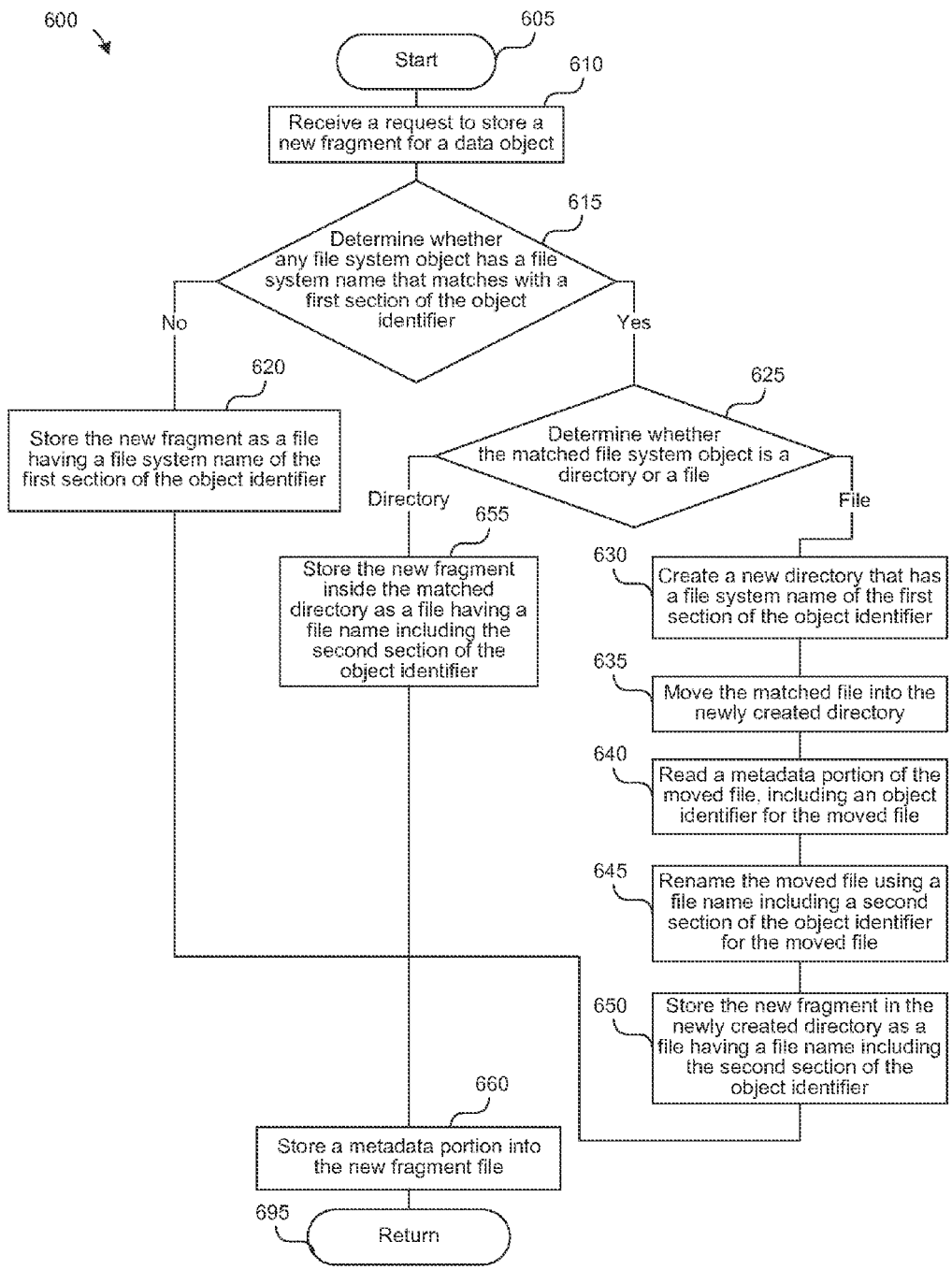
FIG. 6A is a flow diagram illustrating a process for performing a partial key match for a write request, according to various embodiments.

FIG. 6A is a flow diagram illustrating a process for performing a partial key match for a write request, according to various embodiments. The process starts at block 605. At block 610, a storage device receives a request to store a new fragment for a data object. The storage device maintains its own file system for organizing the data fragments stored in the storage device. The request may include an object identifier of the data object, a segment identifier of a data segment to which the new fragment belongs, and a fragment identifier indicating the relative position of the new fragment within the segment. For example, the object identifier can be a string of hexadecimal symbols (e.g., "1AAA2BBB3CCC4DDD"). Alternatively, the object identifier can be a string of other types of characters and/or symbols.

At decision block 615, the storage device determines whether any file system object (e.g., directory or file) has a file system name that matches a first section of the object identifier (e.g., the first eight symbols "1AAA2BBB"). The file system name is defined as a string including the object name as well as the directory names of the directories to which the file object belongs. For example, the storage device may identify an file system object "2BBB" within a root level directory "1AAA". In other words, the file system object has a file system name "/1AAA/2BBB", which matches the first section of the object identifier "1AAA2BBB". Alternatively, the first section can be a section of the object identifier that does not starts at the first symbol of the object identifier.

Figure 6B:
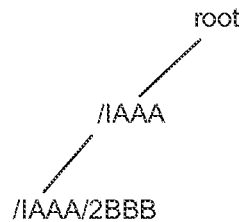
FIG. 6B is a tree diagram illustrating a file system after the new fragment is stored as a file, according to various embodiments.

If there is no file system object having a file system name that matches the first section (e.g., "1AAA2BBB"), the storage device has not stored any data fragment for any data object that has an object identifier with the first section ("1AAA2BBB") yet. At block 620, the storage device stores the new fragment as a file having a file system name of the first section of the object identifier (e.g., file "/1AAA/2BBB"). The storage device can create the directory "/1AAA" as well if the directory has not been created yet. FIG. 6B is a tree diagram illustrating a file system after the new fragment is stored as a file, according to various embodiments.

If there is an existing file system object "/1AAA/2BBB" that matches the first section (e.g., "1AAA2BBB"), at decision block 625, the storage device determines whether the matched file system object is a directory or a file. If the matched file system object is a file, it means that the storage device has already stored a data fragment for a data object that has an object identifier with the first section ("1AAA2BBB"). At block 630, the storage device creates a new directory that has a file system name of the first section of the object identifier (e.g., directory "/1AAA/2BBB").

At block 635, the storage device moves the matched file into the newly created directory (e.g., directory "/1AAA/2BBB"). At block 640, the storage device reads a metadata portion of the moved file, including an object identifier for the moved file, which is a data segment. At block 645, the storage device renames the moved file using a file name including a second section of the object identifier for the moved file (e.g., the ninth to twelfth symbols "3CCD"). In other words, the file system name of the moved filed is "/1AAA/2BBB/3CCD". The file name of the moved file can further include a differentiator such as a integer, a random number or a random symbol. The purpose of the differentiator is to distinguish the file names within the directory from each other.

Figure 6C:
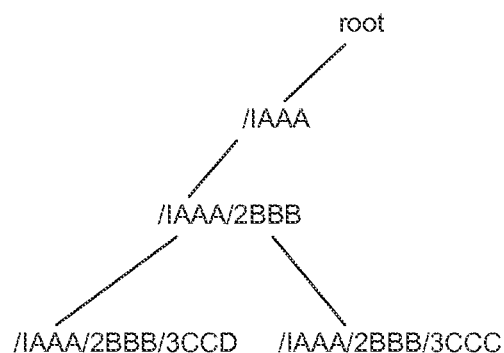
FIG. 6C is a tree diagram illustrating a file system after the new fragment is stored as a file under the newly created directory, according to various embodiments.

At block 650, the storage device stores the new fragment in the newly created directory (e.g., directory "/1AAA/2BBB") as a file having a file name including the second section of the object identifier (e.g., the ninth to twelfth symbols "3CCC"). In other words, the file system name of the new file can be "/1AAA/2BBB/3CCC". The file name of the new fragment file can further include a differentiator such as an integer or a random symbol. FIG. 6C is a tree diagram illustrating a file system after the new fragment is stored as a file under the newly created directory, according to various embodiments.

Figure 6D:
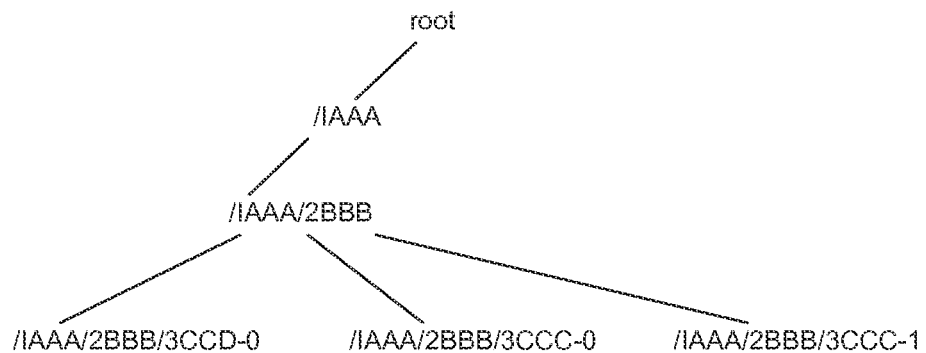
FIG. 6D is a tree diagram illustrating a file system after the new fragment is stored as a file under a directory, according to various embodiments.

If the matched file system object is a directory (e.g., directory "/1AAA/2BBB"), it means that the storage device has already stored at least two data fragments for one or more data objects with object identifier(s) having the first section ("1AAA2BBB"). At block 655, the storage device stores the new fragment inside the matched directory (e.g., directory "/1AAA/2BBB") as a file having a file name including the second section of the object identifier (e.g., the ninth to twelfth symbols "3CCC"). In other words, the file system name of the new file can be "/1AAA/2BBB/3CCC". The file name of the new fragment file can further include a differentiator such as an integer or a random symbol. FIG. 6D is a tree diagram illustrating a file system after the new fragment is stored as a file under a directory, according to various embodiments. When there is existing fragment file "/1AAA/2BBB/3CCC-0", the storage device names the new fragment file as "/1AAA/2BBB/3CCC-1" to differentiate between the files within the same directory.

Once the new fragment is stored as a file in the storage device, at block 660, the storage device stores a metadata portion into the new fragment file. The metadata portion can include various metadata regarding the new fragment.

Figure 7:
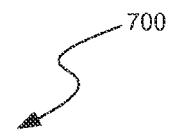
FIG. 7 is a block diagram illustrating a metadata portion of a fragment file, according to various embodiments.

FIG. 7 is a block diagram illustrating a metadata portion of a fragment file, according to various embodiments. The metadata portion 700 includes an object identifier, an object version number, a segment identifier, a fragment identifier, an erasure coding scheme for the segment level, and an erasure coding scheme for the fragment level. For example, the metadata portion 700 in FIG. 7 indicates that the corresponding fragment is a third fragment of the second segment of a data object "1AAA2BBB3CCC4DDD", but a second version. In various embodiments, the object version can be a timestamp. The object version can help schedule deletions and overwrite objects.

Those skilled in the art will appreciate that the logic illustrated in FIG. 6A and described above, and in each of the flow diagrams discussed below, may be altered in a variety of ways. For example, the order of the logic may be rearranged, substeps may be performed in parallel, illustrated logic may be omitted, other logic may be included, etc. For example, the step of renaming a file (block 645) can be performed prior to the step of moving the file (block 635).

In various embodiments, the process shown in FIG. 6A can also be utilized by a storage node that maintains a unified file system for multiple data storage devices. For instance, the storage node may maintain a file system for a redundant arrays of independent disks (RAID). The storage node can performs the partial key match process as illustrated in FIG. 6A to write fragment(s) of a data object across multiple data storage devices.

The storage device maintains the file system such that the directory names and file names are based on sections of object identifiers. As a result, the storage device does not need to maintain a separate database to record the file system locations of the fragment files. Upon receiving a request for reading fragment(s) of a data object, the storage device extracts sections from the object identifier. Then the storage device directly uses the object identifier sections to locate the fragment file(s) of the data object. The request may include an object identifier of the data object.

In various embodiments, the object identifier can be generated by performing a hash function (e.g., SHA 256) on the name of the data object. The object name can be, e.g., a descriptive name or a uniform resource locator (URL) of the data object. Alternatively, the object identifier can be a pseudo random bit string.

Figure 8:
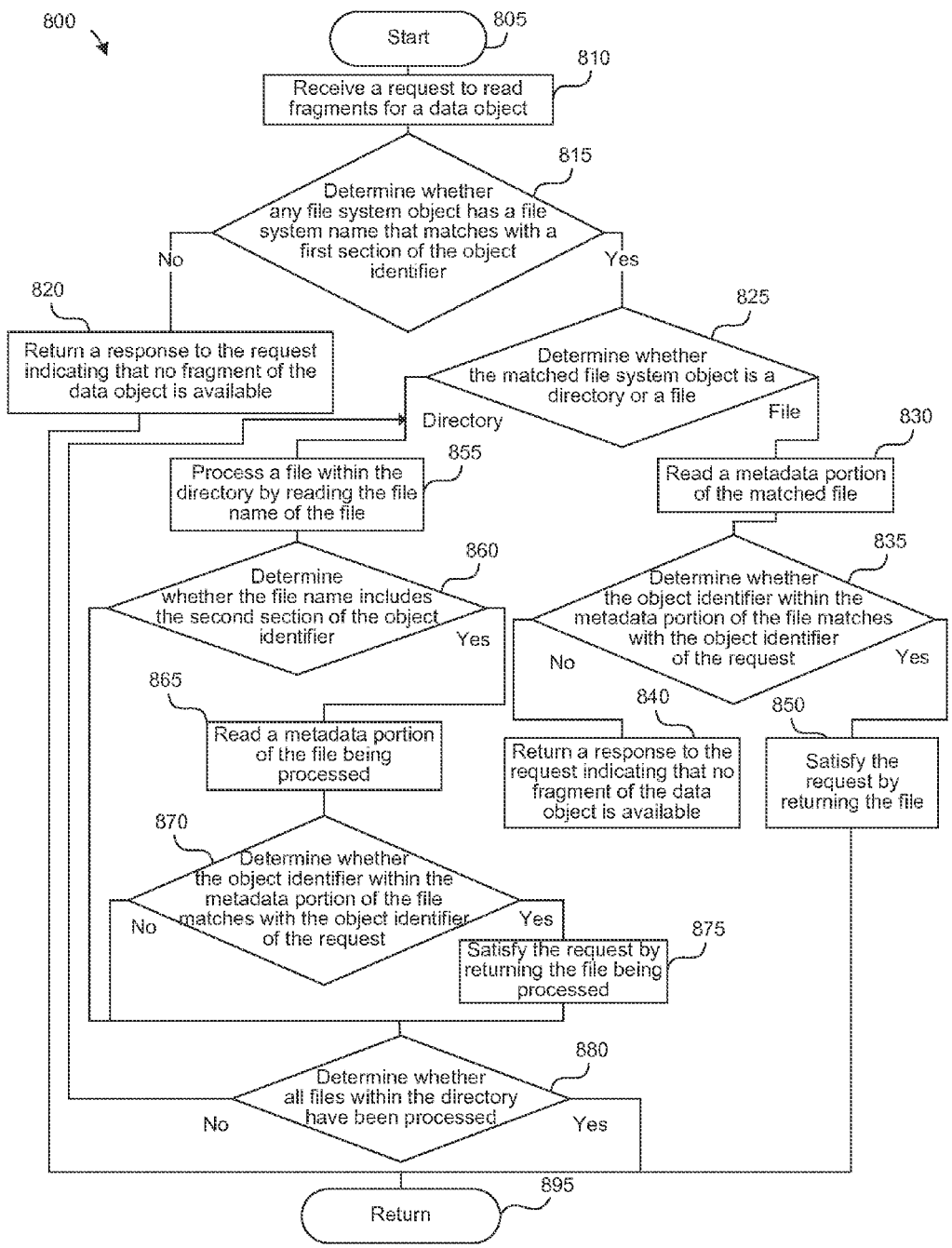
FIG. 8 is a flow diagram illustrating the process for performing a partial key match for a read request, according to various embodiments.

FIG. 8 is a flow diagram illustrating a process for performing a partial key match for a read request, according to various embodiments. The process starts at block 805. At block 810, a storage device receives a request to read fragments for a data object. For example, the object identifier can be a string of hexadecimal symbols (e.g., "1AAA2BBB3CCC4DDD").

At decision block 815, the storage device determines whether any file system object (e.g., directory or file) has a file system name that matches a first section of the object identifier (e.g., the first eight symbols "1AAA2BBB"). In other words, the matched file system name can be "/1AAA/2BBB". Alternatively, the first section can be a section of the object identifier that does not start at the first symbol of the object identifier.

The storage device may maintain an file system name index (e.g., B-tree, B+ tree in XFS file system, binary search tree, or other type of search tree data structure) to increase the efficiency of the partial key match. For example, the storage device may maintain a B-tree data structure for the file system objects. The B-tree is a search tree in that a tree node can have more than two child nodes. A tree node of the B-tree contains a number of keys (e.g., file system object names). The keys are separation values that divide the subtrees below that tree node. The storage device conducts a linear search by only processing one of the subtrees based on the first section of the object identifier. Using such a B-tree data structure, the storage device can efficiently determines whether there is a file system object that has a matching file system name.

If there is no file system object having a file system name that matches the first section (e.g., "1AAA2BBB"), it is clear that the storage device has not stored any data fragment for any data object that has an object identifier with the first section ("1AAA2BBB") yet. At block 820, the storage device returns a response to the request indicating that no fragment of the data object is available.

If there is a file system object (e.g., "/1AAA/2BBB") that matches the first section (e.g., "1AAA2BBB"), at decision block 825, the storage device determines whether the matched file system object is a directory or a file. If the matched file system object is a file, it means that the storage device may have already stored a data fragment for a data object that has an object identifier with the first section ("1AAA2BBB"). At block 830, the storage device reads a metadata portion of the matched file. At decision block 835, the storage device determines whether the object identifier within the metadata portion of the file matches the object identifier of the request. If these two object identifiers do not match, at block 840, the storage device returns a response to the request indicating that no fragment of the data object is available. If these two object identifiers match, at block 850, the storage device satisfies the request by returning the file.

If the matched file system object is a directory (e.g., directory "/1AAA/2BBB"), it means that the storage device has already stored at least two data fragments for one or more data objects with object identifier(s) having the first section ("1AAA2BBB"). At block 855, the storage device processes a file within the directory by reading the file name of the file. At decision block 860, the storage device determines whether the file name includes the second section of the object identifier (e.g., the ninth to twelfth symbols "3CCC").

If the file name includes the second section, at block 865, the storage device reads a metadata portion of the file being processed. At decision block 870, the storage device determines whether the object identifier within the metadata portion of the file matches the object identifier of the request. If these two object identifiers match, at block 875, the storage device satisfies the request by returning the file being processed. If these two object identifiers do not match, the storage device continues to the block 880.

At decision block 880, the storage device determines whether all files within the directory have been processed. If not all files within the directory have been processed, the storage device continues to the block 855 to process the next file within the directory. If all files within the directory have been processed, the storage device continues to block 895.

The FIGS. 6A and 8 illustrate a file system that has a depth level of two. In other words, the fragment files are stored inside of root level directories or stored inside of second level directories. In various embodiments, the file system can have a depth level of more than two or a depth level of one. For example, for a depth level of one, the fragments files can be stored either as root level files or as files inside of root level directories. For a depth level of three, the file system can have root level directories, second level directories and their level directories that are named based on sections of object identifiers.

Figure 9:
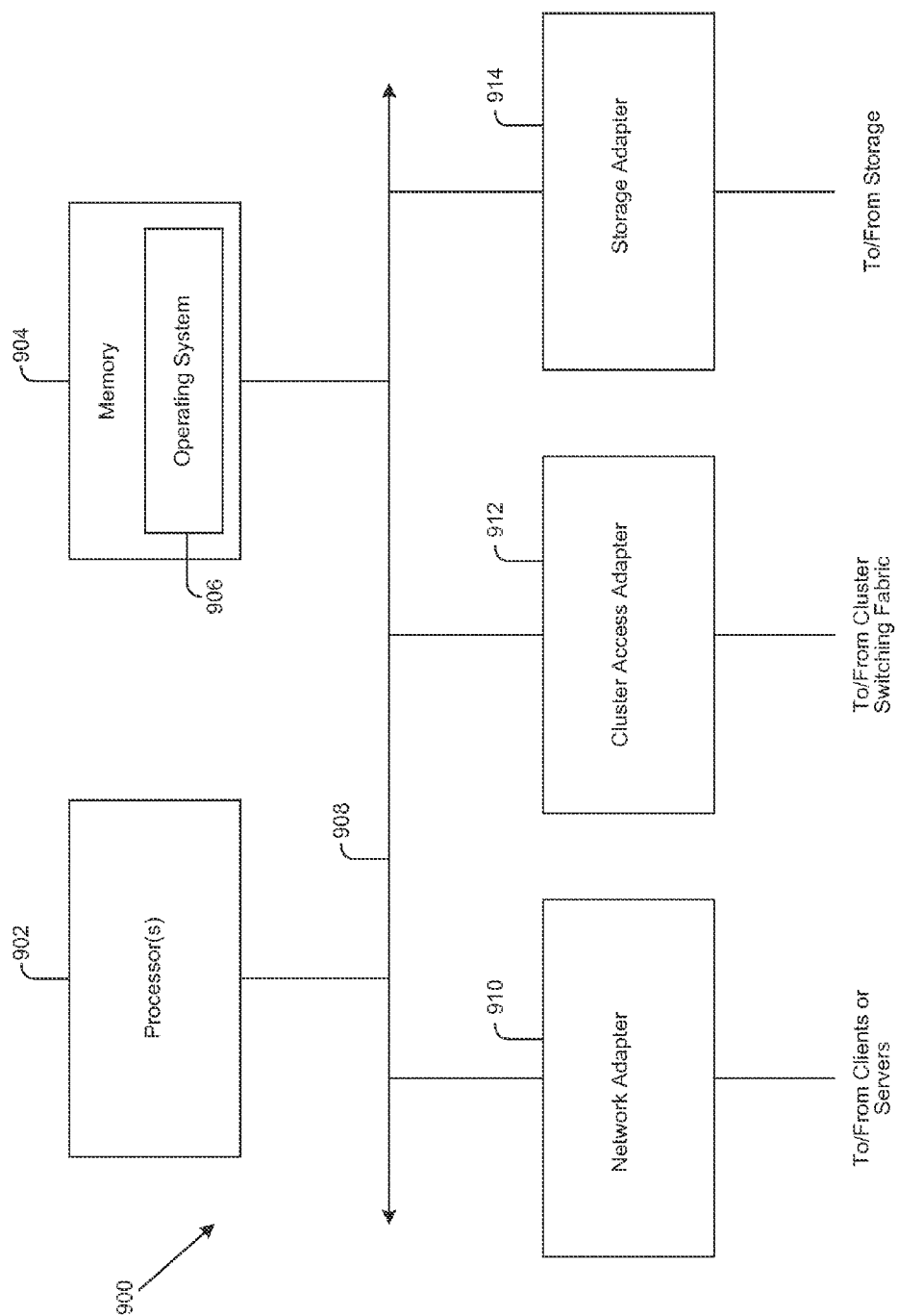
FIG. 9 is a high-level block diagram illustrating an example of a hardware architecture of a computing device that can implement the technology, in various embodiments.

FIG. 9 is a high-level block diagram illustrating an example of a hardware architecture of a computing device for implementing the technology, in various embodiments. A computing device 900 executes some or all of the processor executable process steps that are described below in detail. In various embodiments, the computing device 900 includes a processor subsystem that includes one or more processors 902. Processor 902 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The computing device 900 can further include a memory 904, a network adapter 910, a cluster access adapter 912 and a storage adapter 914, all interconnected by an interconnect 908. Interconnect 908 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 912 includes one or more ports adapted to couple the computing device 900 to other devices. In the illustrated embodiment, Ethernet can be used as the clustering protocol and interconnect media, although other types of protocols and interconnects may be utilized within the cluster architecture described herein.

The computing device 900 can be embodied as a single- or multi-processor storage system executing a storage operating system 906 that can implement a high-level module, e.g., a storage manager, to logically organize the information as a hierarchical structure of named directories, files and special types of files called virtual disks (hereinafter generally "blocks") at the storage devices. The computing device 900 can further include graphical processing unit(s) for graphical processing tasks or processing non-graphical tasks in parallel.

The memory 904 can comprise storage locations that are addressable by the processor(s) 902 and adapters 910, 912, and 914 for storing processor executable code and data structures. The processor 902 and adapters 910, 912, and 914 may, in turn, comprise processing elements and/or logic circuitry configured to execute the software code and manipulate the data structures. The operating system 906, portions of which are typically resident in memory and executed by the processors(s) 902, functionally organizes the computing device 900 by (among other things) configuring the processor(s) 902 to perform. It will be apparent to those skilled in the art that other processing and memory implementations, including various computer readable storage media, may be used for storing and executing program instructions pertaining to the technology.

The network adapter 910 can include multiple ports to couple the computing device 900 to one or more clients over point-to-point links, wide area networks, virtual private networks implemented over a public network (e.g., the Internet) or a shared local area network. The network adapter 910 thus can include the mechanical, electrical and signaling circuitry needed to connect the computing device 900 to the network. Illustratively, the network can be embodied as an Ethernet network or a Fibre Channel (FC) network. A client can communicate with the computing device over the network by exchanging discrete frames or packets of data according to predefined protocols, e.g., TCP/IP.

The storage adapter 914 can cooperate with the storage operating system 906 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 914 can include multiple ports having input/output (I/O) interface circuitry that couples to the disks over an I/O interconnect arrangement, e.g., a conventional high-performance, Fibre Channel (FC) link topology. In various embodiments, the cluster adapter 912 and the storage adapter 914 can be implemented as one adaptor configured to connect to a switching fabric, e.g., a storage network switch, to communicate with other devices and the mass storage devices.

Various modifications and additions can be made to the embodiments discussed without departing from the scope of the disclosure. For example, while the embodiments described above refer to particular features, the scope also includes embodiments having different combinations of features and embodiments that do not include all of the described features. Accordingly, the scope is intended to embrace all such alternatives, modifications, and variations and all equivalents thereof.

What is claimed is:

1. A method, comprising:
    based on receipt of a request to store a data fragment of a data object at a storage node of a distributed storage system, determining whether a file system of the storage node has an existing file system object having a file system name that matches a first section of an object identifier of the data object;
    storing, in the file system of the storage node, the data fragment as a file with a file system name that matches the first section of the object identifier, based on a determination that there is no file system object in the file system that matches the first section; and based on a determination that the file system includes a file system object with a file system name that matches the first section of the object identifier,
creating a directory with the file system name that matches the first section; and
storing within the directory the data fragment as a file having a file name including a second section of the object identifier.

2. The method of claim 1, further comprising:
determining, by the storage node, that the file system object having the file system name that matches the first section of the object identifier is a file;
renaming the file having the file system name that matches the first section to include the second section of the object identifier; and
moving the renamed file into the directory.

3. The method of claim 2,
wherein at least one of renaming the file and storing the data fragment comprises differentiating the file names of the renamed file and the file.

4. The method of claim 1, further comprising:
returning, by the storage node, a response confirming that the data fragment of the data object has been successfully stored in the storage node.

5. The method of claim 1, wherein the determining whether a file system of the storage node has an existing file system object having a file system name that matches a first section of an object identifier of the data object comprises:
linearly searching a file system name index.

6. The method of claim 1, wherein storing the data fragment as the file comprises:
inserting, by the storage node, fragment metadata into the file.

7. The method of claim 6, wherein the fragment metadata comprises:
the object identifier of the data object;
a version number of the data object;
a segment identifier of a data segment to which the data fragment belongs; and
a fragment identifier indicating a relative position of the data fragment within the data segment.

8. A non-transitory machine readable medium comprising instructions for maintaining object fragments in a file system of a storage node of a distributed storage system, the instructions executable to:
based on receipt of a request to read a data fragment of a data object from a storage node, determine whether the file system of the storage node has an existing file system object having a file system name that matches a first section of an object identifier for the data object;
based on a determination that the file system has an existing file system object having the file system name that matches the first section, determine whether the file system object is a file or a directory;
based on a determination that the file system object having the file system name that matches the first section is a file, read fragment metadata from the file to verify that the fragment metadata comprises the object identifier;
based on a determination that the fragment metadata read from the file comprises the object identifier, return the file in response to the request; and
based on a determination that the file system object having the file system name that matches the first section is a directory, determine which files within the directory comprises fragment metadata that comprise the object identifier and return the ones of the files determined to comprise fragment metadata that comprise the object identifier.

9. The non-transitory machine readable medium of claim 8 further comprising instructions executable to:
based on a determination that the file system does not have a file system object having the file system name that matches the first section, return a response message indicating that no data fragment of the data object is available from the storage node.

10. The non-transitory machine readable medium of claim 8 to further comprising instructions executable to:
based on a determination that the file system object having the file system name that matches the first section is a directory, identify files within the directory having a file system name that includes a second section of the object identifier,
wherein the instructions executable to determine which files within the directory comprises fragment metadata that comprise the object identifier comprise the instructions executable to read the fragment metadata from the files identified as having a file system name that includes the second section.

11. The non-transitory machine readable medium of claim 8, wherein the instructions executable to determine whether the file system of the storage node has an existing file system object having a file system name that matches a first section of an object identifier for the data object comprise instructions executable to:
conduct a linear search in a file system name index for the first section.

12. A computing device, comprising:
a processor; and
a machine readable medium comprising program code executable by the processor to cause the computing device to:
based on receipt of a request to access data of a data object identified by an object identifier that comprises at least a first section and a second section, determine whether a file system of the computing device includes a file system object with a file system name that includes the first section of the object identifier;
based on a determination that the file system includes a file system object having the file system name that includes the first section and that the file system object is a file, return the file as part of the data object; and
based on a determination that the file system includes a file system object having the file system name that includes the first section and that the file system object is a directory, verify that each of a plurality of files within the directory comprises fragment metadata that comprise the object identifier and return verified ones of the plurality of files as parts of the data object.

13. The computing device of claim 12, wherein the machine readable medium further comprises program code executable by the processor to cause the computing device to:
verify that the file having the file system name that includes the first section comprises fragment metadata that comprise the object identifier;
wherein return of the file as part of the data object is also based on verification of the file.

14. The computing device of claim 12, wherein machine readable medium further comprises code executable by the processor to cause the computing device to:
 determine the plurality of files as files within the directory having a file name that includes the second section.

15. The computing device of claim 12, wherein the data object includes multiple segments, at least one of the segments includes multiple fragments, wherein the fragments are stored in a distributed storage system that includes the computing device and at least one of the fragments is stored in the computing device.

16. The computing device of claim 12, wherein the data object is erasure coded for storing into a distributed storage system that includes the computing device and the fragment metadata read from a file comprises the object identifier, a segment identifier, a fragment identifier, and erasure coding parameters.

\* \* \* \* \*